United States Patent [19]

Kato et al.

[11] Patent Number: 4,735,925

[45] Date of Patent: Apr. 5, 1988

[54] LOW-TEMPERATURE SINTERABLE CERAMIC COMPOSITION

[75] Inventors: Takashi Kato; Minato Ando, both of Aichi, Japan

[73] Assignee: NGK Spark Plug Co., Ltd., Aichi, Japan

[21] Appl. No.: 874,184

[22] Filed: Jun. 13, 1986

[30] Foreign Application Priority Data

Jun. 14, 1985 [JP] Japan ................ 60-127966

[51] Int. Cl.⁴ .................. C04B 35/48; C04B 35/10
[52] U.S. Cl. ................... 501/107; 501/106; 501/120; 501/128; 501/133; 501/151; 501/153
[58] Field of Search ........... 501/106, 107, 151, 133, 501/128, 153, 120

[56] References Cited

U.S. PATENT DOCUMENTS

| | | | |
|---|---|---|---|
| 4,102,690 | 7/1978 | Koper | 501/133 X |
| 4,104,075 | 8/1978 | Hayashi et al. | 501/133 X |
| 4,273,587 | 6/1981 | Oda et al. | 501/153 |
| 4,295,892 | 10/1981 | Matsuhisa et al. | 501/153 X |
| 4,316,936 | 2/1982 | Hing | 501/128 X |
| 4,584,151 | 4/1986 | Matsui et al. | 501/153 X |

FOREIGN PATENT DOCUMENTS

| | | | |
|---|---|---|---|
| 43-3706 | 2/1968 | Japan | 501/106 |
| 55-136171 | 10/1980 | Japan | 501/151 |
| 61-36168 | 2/1986 | Japan | 501/128 |
| 186261 | 8/1986 | Japan . | |
| 186260 | 8/1986 | Japan . | |
| 545239 | 5/1942 | United Kingdom | 501/106 |
| 2031399 | 4/1980 | United Kingdom | 501/153 |
| 876610 | 10/1981 | U.S.S.R. | 501/128 |

*Primary Examiner*—Mark L. Bell
*Assistant Examiner*—A. Knab
*Attorney, Agent, or Firm*—Sughrue, Mion, Zinn, Macpeak, and Seas

[57] ABSTRACT

A low-temperature sinterable ceramic composition comprising 1 to 20% by weight of $Al_2O_3$, 15 to 50% by weight of $SiO_2$, 0 to 5% by weight of MgO, 3 to 18% by weight of CaO, 0 to 5% by weight of $TiO_2$, 1 to 8% by weight of $B_2O_3$, 0 to 2% by weight of $Li_2O$, 20 to 80% by weight of at least one of zircon, mullite and spinel, and 1 to 12% by weight of a fluoride selected from $CaF_2$, $MgF_2$, LiF, $AlF_3$, $MnF_2$, $BaF_2$ and $SrF_2$.

2 Claims, No Drawings

LOW-TEMPERATURE SINTERABLE CERAMIC COMPOSITION

FIELD OF THE INVENTION

This invention relates to a ceramic composition which can be used as an electrically insulating material in IC packages, IC boards, multilayer wiring boards, etc., and particularly to a ceramic composition that can be sintered at low temperatures.

BACKGROUND OF THE INVENTION

Alumina having an excellent insulating property, heat resistance and mechanical strength has been widely used as an electrically insulating material. However, the sintering temperature of alumina is 1300° to 1600° C. This high firing temperature leads to a high cost of production.

In addition, boards, etc. have been made of high-melting metals, such as W and Mo-Mn as a conductive material. However, such conductive metals have high electrical resistance, and therefore, the speed of transmitting signals is slow.

In Japanese Patent Application Nos. 27124/1985 and 27125/1985, ceramic materials which can be fired at temperatures of not higher than 1,000° C. and on which a low-electric resistance conductor such as Ag, Ag-Pd, Au and Cu, can be attached and baked were studied. The results of these studies yielded a material composed of $SiO_2$-$CaO$-$Al_2O_3$-$B_2O_3$ and zircon and a material composed of ($SiO_2$-$CaO$-$B_2O_3$-$Al_2O_3$), respectively.

Crystallized glass has a relatively high mechanical strength as a material onto which a low-electric resistance metal is baked, but is of high cost. A sintered ceramic body is inexpensive, but has the disadvantage of low strength. The ceramic compositions described in the above-cited Japanese Patent applications are improved to some extent, but it is desired to develop a more improved ceramic composition.

SUMMARY OF THE INVENTION

It has been found in the present invention that a ceramic composition comprising a fluoride meets the aforesaid requirements. Specifically, the present invention relates to a low-temperature sinterable ceramic composition comprising 1 to 20% by weight of $Al_2O_3$, 15 to 50% by weight of $SiO_2$, 0 to 5% by weight of $MgO$, 3 to 18% by weight of $CaO$, 0 to 5% by weight of $TiO_2$, 1 to 8% by weight of $B_2O_3$, 0 to 2% by weight of $Li_2O$, 20 to 80% by weight of at least one of zircon, mullite and spinel, and 1 to 12% by weight of a fluoride selected from $CaF_2$, $MgF_2$, $LiF$, $AlF_3$, $MnF_2$, $BaF_2$ and $SrF_2$.

DETAILED DESCRIPTION OF THE INVENTION

When the amount of $Al_2O_3$ is less than 1% by weight, the coefficient of thermal expansion of the composition tends to become high. If the amount of $Al_2O_3$ exceeds 20% by weight, the sintering temperature of the composition tends to become high. If the amount of $SiO_2$ is less than 15% by weight, the resulting composition tends to have a high sintering temperature and a high dielectric constant. If it exceeds 50% by weight, the coefficient of thermal expansion of the composition tends to increase. If the amount of $MgO$ is larger than 5% by weight, the composition tends to have a high sintering temperature and a high coefficient of thermal expansion. If the amount of CaO is less than 3% by weight, the sintering temperature of the composition tends to become high, and if the amount of CaO is larger than 18% by weight, the dielectric constant of the composition tends to be high. If the amount of $TiO_2$ is larger than 5% by weight, the resulting composition tends to have a high dielectric constant. If the amount of $B_2O_3$ is less than 1% by weight, the composition tends to have a high sintering temperature, and if it exceeds 8% by weight, the composition tends to have a low impact strength. If the amount of $Li_2O$ is larger than 2% by weight, the impact strength of the composition tends to become low. If the amount of zircon, mullite or spinel is less than 20% by weight, the resulting composition tends to have low impact strength and a high coefficient of thermal expansion. If the amount of any of these components exceeds 80% by weight the sintering temperature of the composition tends to become too high. In particular, if zircon is used as a ingredient, the dielectric constant of the composition also tends to become high. If the amount of the fluoride is less than 1% by weight, the flexural strength of the composition tends to become low, and if it is larger than 12% by weight, the coefficient of thermal expansion of the composition tends to become too high.

The zircon, mullite and spinel are natural occuring products which are of more than 99% by weight in purity and have compositions of $ZrO_2.SiO_2$, $3Al_2O_3.2SiO_2$ and $MgO.Al_2O_3$ respectively. These may contain less than 0.1% by weight of total amount of $Na_2O$ and $K_2O$ as impurities.

The most preferable composition according to the present invention comprises 2 to 4% by weight of $Al_2O_3$, 20 to 40% by weight of $SiO_2$, 0.5 to 1% by weight of $MgO$, 5 to 10% by weight of $CaO$, 1 to 2% by weight of $TiO_2$, 3 to 6% by weight of $B_2O_3$, 0.5 to 1% by weight of $Li_2O$, 40 to 60% by weight of zircon and 4 to 8% by weight of $CaF_2$ or $SrF_2$.

One difference between the composition of this invention and that of the prior art is that the fluoride is incorporated in the composition. This can markedly increase the mechanical strength of the resulting composition, and at the same time, decrease the firing temperature of the ceramic composition. The details of the action of the fluoride, however, have not yet been elucidated.

The ceramic composition according to the present invention may be molded in a usual manner, such as press molding, sheet molding, etc, and sintered. For example, in a press molding, an aqueous mixture of raw material of the composition and binder is mixed and ground, for example, in a ball-mill, dried by spray dry, freeze dry etc., sieved and pressed to obtain a molded product.

In the process, polyvinylalcohol (PVA), carboxymethyl cellulose (CMC), methyl cellulose (MC), acryl emulsion and gum arabic may be used in an amount of 1 to 5% by weight based on a dry raw material as 100.

In a sheet molding, a raw material is dispersed in a dispersant, such as toluene, ketone, etc. together with a binder, such as acrylic resin, butyral resin, etc., and a plasticizer, such as polyethylene glycohol, phthalate ester, etc., kneaded and ground, reduced form, tape casted, dried, and degreased to obtain molded product. In this process 20 to 30% by weight of the binder and 5 to 10% by weight of the plasticizer based on a dry raw material as 100, may be used.

The present invention is further explained in detail with referring to the following non-limiting examples.

EXAMPLE

| | |
|---|---|
| Alumina (Al$_2$O$_3$) | |
| Silicic anhydride (SiO$_2$ reagent) | |
| Magnesium oxide MgO reagent) | 500 g |
| Calcium carbonate (CaCO$_3$ reagent) | (the proportions of the individual components are indicated in the following tables) |
| Titanium dioxide (TiO$_2$ reagent) | |
| Boron oxide (B$_2$O$_3$ reagent) | |
| Lithium meta-silicate (Li$_2$SiO$_3$ reagent) | |
| At least one of zirconium, mullite and spinel | |
| Fluoride | |
| Hydroxypropyl cellulose (HPC-SL, a tradename for a product of Nippon Soda Co., Ltd. | 15 g |
| Water | 400 ml |

The above component were put in a 3-liter alumina ceramic ball mill together with 2 kg of alumina ceramic spheres having a diameter of 15 mm, and mixed at 84 rpm for 50 hours.

The resulting slurry was lyophilized by a lyophilizer for 15 hours. The dried powder was passed through a 32-mesh sieve and then compressed in a mold into a desired shape under a pressure of 1500 kg/cm$^2$. The molded product was examined for its sintering temperature, fluxural strength, dielectric constant, and coefficient of thermal expansion. The results are shown below.

| Sample No. | Al$_2$O$_3$ | SiO$_2$ | MgO | CaO | TiO$_2$ | B$_2$O$_3$ | Li$_2$O | Zircon or Mullite, Spinel | Fluoride | Sintering Temperature °C. | Flexural Strength kg/cm$^2$ | Dielectric Constant at 1 MHz | Dielectric Power Factor × 10$^{-4}$ | Coefficient of Thermal Expansion × 10$^{-6}$/°C. |
|---|---|---|---|---|---|---|---|---|---|---|---|---|---|---|
| 1 Comparison | 5 | 26.25 | 1.0 | 10.5 | 1.5 | 5.0 | 0.75 | Zr 50 | 0 | 950 | 2030 | 7.4 | 34 | 7.2 |
| 2 Invention | 4.95 | 25.99 | 0.99 | 10.40 | 1.49 | 4.95 | 0.74 | Zr 49.5 | CaF$_2$ 1 | 930 | 2160 | 7.3 | 35 | 7.3 |
| 3 Invention | 4.75 | 24.94 | 0.95 | 9.98 | 1.43 | 4.75 | 0.71 | Zr 47.5 | CaF$_2$ 5 | 910 | 2460 | 7.1 | 39 | 7.5 |
| 4 Invention | 4.4 | 23.1 | 0.88 | 9.24 | 1.32 | 4.4 | 0.66 | Zr 44.0 | CaF$_2$ 12 | 900 | 2650 | 7.0 | 46 | 7.7 |
| 5 Comparison | 4.25 | 22.31 | 0.85 | 8.93 | 1.28 | 4.25 | 0.64 | Zr 42.5 | CaF$_2$ 15 | 880 | 2670 | 6.8 | 53 | 8.2 |
| 6 Invention | 4.75 | 24.94 | 0.95 | 9.98 | 1.43 | 4.75 | 0.71 | Zr 47.5 | MgF$_2$ 5 | 910 | 2430 | 7.1 | 40 | 7.6 |
| 7 Invention | 4.75 | 24.94 | 0.95 | 9.98 | 1.43 | 4.75 | 0.71 | Zr 47.5 | AlF$_3$ 5 | 920 | 2410 | 7.2 | 36 | 7.5 |
| 8 Invention | 4.75 | 24.94 | 0.95 | 9.98 | 1.43 | 4.75 | 0.71 | Zr 47.5 | LiF 5 | 910 | 2450 | 7.0 | 39 | 7.6 |
| 9 Invention | 7.24 | 38.00 | 1.45 | 15.21 | 2.18 | 7.24 | 1.08 | Zr 20 | CaF$_2$ 7.62 | 880 | 2130 | 6.8 | 41 | 7.7 |
| 10 | 1.81 | 9.50 | 0.36 | 3.80 | 0.54 | 1.81 | 8.27 | Zr 80 | CaF$_2$ 1.90 | 960 | 2400 | 7.8 | 28 | 6.6 |
| 11 | 4.75 | 24.94 | 0.95 | 9.98 | 1.43 | 4.75 | 0.71 | Spinel 47.5 | CaF$_2$ 5 | 915 | 2530 | 7.2 | 30 | 8.6 |
| 12 Invention | 4.75 | 24.94 | 0.95 | 9.98 | 1.43 | 4.75 | 0.71 | Mullite 47.5 | CaF$_2$ 5 | 920 | 2410 | 6.6 | 41 | 7.6 |
| 13 Invention | 4.75 | 24.94 | 0.95 | 9.98 | 1.43 | 4.75 | 0.71 | Spinel 47.5 | CaF$_2$ 5 | 900 | 2490 | 7.0 | 29 | 7.8 |
| 14 Invention | 1 | 25.92 | 0.99 | 10.37 | 1.49 | 4.94 | 0.74 | Zr 49.4 | CaF$_2$ 5.20 | 900 | 2460 | 7.0 | 40 | 7.9 |
| 15 Invention | 20 | 20.95 | 0.80 | 8.38 | 1.20 | 3.99 | 0.60 | Zr 39.9 | CaF$_2$ 4.20 | 990 | 2480 | 7.8 | 31 | 7.2 |
| 16 Invention | 5.38 | 15 | 1.08 | 11.30 | 1.62 | 5.38 | 0.80 | Zr 53.79 | CaF$_2$ 5.66 | 980 | 2420 | 7.9 | 40 | 7.0 |
| 17 Invention | 3.16 | 50 | 0.63 | 6.65 | 0.95 | 3.16 | 0.47 | Zr 31.64 | CaF$_2$ 3.33 | 890 | 2420 | 6.8 | 41 | 8.2 |
| 18 Invention | 4.80 | 25.18 | 0 | 10.08 | 1.44 | 4.80 | 0.72 | Zr 47.96 | CaF$_2$ 5.05 | 900 | 2440 | 7.0 | 40 | 7.3 |
| 19 Invention | 4.56 | 23.92 | 5 | 9.57 | 1.37 | 4.56 | 0.68 | Zr 45.56 | CaF$_2$ 4.80 | 990 | 2430 | 7.1 | 40 | 7.8 |
| 20 Invention | 5.12 | 26.87 | 1.01 | 3 | 1.54 | 5.12 | 0.77 | Zr 51.18 | CaF$_2$ 5.39 | 980 | 2450 | 6.9 | 38 | 7.2 |
| 21 Invention | 4.33 | 22.72 | 0.87 | 18 | 1.30 | 4.33 | 0.65 | Zr 43.27 | CaF$_2$ 4.55 | 880 | 2470 | 7.8 | 40 | 7.8 |
| 22 Invention | 4.82 | 25.30 | 0.96 | 10.12 | 0 | 4.82 | 0.72 | Zr 48.19 | CaF$_2$ 5.07 | 940 | 2380 | 6.7 | 37 | 7.3 |
| 23 Invention | 4.58 | 24.04 | 0.92 | 9.62 | 5 | 4.58 | 0.68 | Zr 45.78 | CaF$_2$ 4.82 | 870 | 2510 | 7.9 | 43 | 7.6 |
| 24 Invention | 4.94 | 25.92 | 0.99 | 10.37 | 1.49 | 1 | 0.74 | Zr 49.37 | CaF$_2$ 5.20 | 1000 | 2480 | 7.0 | 38 | 7.6 |
| 25 Invention | 4.59 | 24.09 | 0.92 | 9.64 | 1.38 | 8 | 0.69 | Zr 45.88 | CaF$_2$ 4.83 | 840 | 2030 | 7.2 | 41 | 7.2 |
| 26 Invention | 4.78 | 25.12 | 0.96 | 10.05 | 1.44 | 4.78 | 0 | Zr 47.84 | CaF$_2$ 5.04 | 940 | 2450 | 7.3 | 38 | 7.6 |
| 27 | 4.69 | 24.62 | 0.94 | 9.85 | 1.41 | 5.69 | 2 | 46.88 | CaF$_2$ 4.94 | 870 | 2110 | 6.8 | 40 | 7.4 |
| 28 Invention | 4.75 | 24.94 | 0.95 | 9.98 | 1.43 | 4.75 | 0.71 | Zr 23.75 Spinel | CaF$_2$ 5 | 910 | 2480 | 7.1 | 35 | 7.6 |

-continued

| Sample No. | Al$_2$O$_3$ | SiO$_2$ | MgO | CaO | TiO$_2$ | B$_2$O$_3$ | Li$_2$O | Zircon or Mullite, Spinel | Fluoride | Sintering Temperature °C. | Flexural Strength kg/cm$^2$ | Dielectric Constant at 1 MHz | Dielectric Power Factor × 10$^{-4}$ | Coefficient of Thermal Expansion × 10$^{-6}$/°C. |
|---|---|---|---|---|---|---|---|---|---|---|---|---|---|---|
| 29 Invention | 4.75 | 24.94 | 0.95 | 9.98 | 1.43 | 4.75 | 0.71 | Zr 23.75 Spinel 23.75 23.75 | CaF$_2$ 5 | 920 | 2430 | 6.9 | 40 | 7.4 |
| 30 Invention | 4.75 | 24.94 | 0.95 | 9.98 | 1.43 | 4.75 | 0.71 | Zr 23.75 Spinel 23.75 23.75 | CaF$_2$ 5 | 910 | 2460 | 6.8 | 36 | 7.6 |

Since the ceramic composition has a sintering temperature of not more than 1000° C., the cost of firing can be curtailed, and low-resistance conductors such as Ag, Ag-Pd, Au and Cu can be baked on it. As a result, the speed of transmitting signals can be increased. Furthermore, the ceramic composition of this invention has a flexural strength of as high as about 2,000 to 2,500 kg/cm$^2$ and a sufficiently low dielectric constant and dielectric power factor. In addition, its coefficient of thermal expansion is not high.

It is preferred in the present invention that the low-temperature sinterable ceramic composition has a sintering temperature of not higher than 1,000° C., a flexural strength of at least 2,100 kg/cm$^2$, a dielectric constant of not more than 8 at 1 MHz and a coefficient of thermal expansion of not more than 8×2$^{-6}$/°C., more preferably a stintering temperature of 850° to 950° C., a flexural strength of at least 2,500 kg/cm$^2$, a dielectric constant of not more than 6 at 1 MHz and coefficient of thermal expansion of not more than 4 to 6×10$^{-6}$/°C.

While the invention has been described in detail and with reference to specific embodiments thereof, it will be apparent to one skilled in the art that various changes and modifications can be made therein without departing from the spirit and scope thereof.

What is claimed is:

1. A low-temperature sinterable ceramic composition consisting essentially of 1 to 20% by weight of Al$_2$O$_3$, 15 to 50% by weight of SiO$_2$, 0 to 5% by weight of MgO, 3 to 18% by weight of CaO, 0 to 5% by weight of TiO$_2$, 1 to 8% by weight of B$_2$O$_3$, 0 to 2% by weight of Li$_2$O, 20 to 80% by weight of at least one zircon, mullite and spinel, and 1 to 12% by weight of a fluoride selected from CaF$_2$, MgF$_2$, LiF, AlF$_3$, MnF$_2$ and SrF$_2$, wherein said composition has a sintering temperature of not more than 1,000° C., a flexural strength of at least 2,100 kg/cm$^2$, a dielectric constant of not more than 8 at 1 MHz, and a coefficient of thermal expansion of not more than 8×10$^{-6}$/°C.

2. A low-temperature sinterable ceramic composition of claim 1, wherein the composition consists essentially of 2 to 4% by weight of Al$_2$O$_3$, 20 to 40% by weight of SiO$_2$, 0.5 to 1% by weight of MgO, 5 to 10% by weight of CaO, 1 to 2% by weight of TiO$_2$, 3 to 6% by weight of B$_2$O$_3$, 0.5 to 1% by weight of Li$_2$O, 40 to 60% by weight of Zircon and 4 to 8% by weight of CaF$_2$ or SrF$_2$.

* * * * *